United States Patent
Hao et al.

(10) Patent No.: US 8,218,452 B2
(45) Date of Patent: Jul. 10, 2012

(54) NETWORK DETECTION OF REAL-TIME APPLICATIONS USING INCREMENTAL LINEAR REGRESSION

(75) Inventors: Fang Hao, Morganville, NJ (US); Muralidharan Sampath Kodialam, Marlboro, NJ (US); Tirunell V. Lakshman, Eatontown, NJ (US)

(73) Assignee: Alcatel Lucent, Paris (FR)

( * ) Notice: Subject to any disclaimer, the term of this patent is extended or adjusted under 35 U.S.C. 154(b) by 525 days.

(21) Appl. No.: 12/495,236

(22) Filed: Jun. 30, 2009

(65) Prior Publication Data

US 2010/0329133 A1 Dec. 30, 2010

(51) Int. Cl.
*H04L 12/26* (2006.01)

(52) U.S. Cl. ........................... 370/253; 709/231

(58) Field of Classification Search .................. 370/252, 370/253, 469, 484, 486; 709/231, 236; 726/1, 726/2, 11, 12, 22
See application file for complete search history.

(56) References Cited

U.S. PATENT DOCUMENTS

| | | | | |
|---|---|---|---|---|
| 5,691,916 A * | 11/1997 | Van Den Brink et al. | ..... | 370/252 |
| 7,460,480 B2 * | 12/2008 | Awais | ............ | 370/252 |
| 7,849,186 B2 * | 12/2010 | Satt et al. | ........ | 709/231 |
| 2008/0091838 A1 * | 4/2008 | Miceli | ............ | 709/231 |
| 2010/0023635 A1 * | 1/2010 | Labonte et al. | ........ | 709/231 |
| 2010/0287297 A1 * | 11/2010 | Lefebvre | ........ | 709/231 |
| 2011/0149782 A1 * | 6/2011 | Townley et al. | ........ | 370/252 |
| 2012/0036277 A1 * | 2/2012 | Stokking et al. | ........ | 709/231 |

* cited by examiner

*Primary Examiner* — Jeffrey M Rutkowski
(74) *Attorney, Agent, or Firm* — Wall & Tong, LLP

(57) ABSTRACT

Method and apparatus using incremental linear regression to derive a traffic flow signature indicative of a particular application within a packet stream.

17 Claims, 4 Drawing Sheets

NETWORK DETECTION OF REAL-TIME APPLICATIONS USING INCREMENTAL LINEAR REGRESSION

FIELD OF THE INVENTION

The present invention relates generally to network management and, more particularly, to identifying specific types of network traffic such as real-time network applications.

BACKGROUND OF THE INVENTION

Traffic generated by Voice over Internet Protocol (VoIP) and Internet video sources has been growing significantly in recent years. There is a pressing demand for network operators to identify and manage such traffic. First, such traffic often consumes a significant amount of bandwidth and may adversely affect the quality of other applications. Second, such applications may compete with a network operator's own service and result in lost revenue for the provider. Third, regulations in certain countries or regions require service providers to closely monitor voice calls. However, voice and video applications are often difficult to detect since they may use dynamic ports and encrypted payload. One prominent example is Skype, a VoIP application based on peer-to-peer technology.

Traditional approaches for application identification are typically based on one or more of the following characteristics:

(1) UDP/TCP ports. This does not work for applications that employ dynamic ports (e.g., most P2P traffic);

(2) Payload signature. Signature expires very quickly due to new application version updates. This also does not work for encrypted content; and (3) Machine learning. This requires training the model by using existing data set. Such approaches may not always be reliable and have high run-time overhead.

(4) Naüve Bayes Classifier. This approach explores the packet inter-arrival gap and payload size information of VoIP flows, and builds hypothesis tests to detect VoIP flow. However, this approach also suffers from relatively high false identification rates. The reason is that this approach assumes the packet inter-arrival gaps are independent and fit a normal distribution. Unfortunately, this assumption is not correct.

SUMMARY OF THE INVENTION

The present invention contemplates a new and improved method that resolves the above-referenced difficulties and others. Various deficiencies of the prior art are addressed by the present invention of systems, methods and apparatus for identifying real-time network applications such as VoIP and Internet video using techniques including incremental linear regression.

Various embodiments provide a mechanism using incremental linear regression to derive a traffic flow signature indicative of a particular application within a packet stream.

A method for identifying an application associated with a packet stream according to one embodiment comprises determining, for each of a plurality of time intervals, packet arrival times (PATs) for received packets of interest within the packet stream; fitting a regression line to the determined PATs of the received packets of interest for each time interval, the regression line having associated with it a slope indicative of a traffic rate of the packet stream during the time interval; and using the regression lines associated with the time intervals to identify the type of application provided via the packet stream.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

A more complete understanding of the invention may be obtained from consideration of the following detailed description of the invention in conjunction with drawings, with like elements referenced with like reference numerals, in which.

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Various embodiments will be described herein with respect to a system in which content encoded at a first location is transported to a second location via a network. The encoded content conveyed to the second location is received as a stream of packets which are then processed according to various embodiments to identify the codec used to encode the content and/or determine when parameters associated with the codec have been changed. In this manner, a determination may be made as to the type of application being supported by the packet stream such that various controls and/or resource allocations may be made with respect to the packet stream.

Packet generation times of real-time applications are typically determined by the codec used to process the application data. In the ideal case, packets are generated at constant intervals such that packet inter-arrival gaps should be constant. Part of the invention rests in the recognition by the inventors that, due to variations in software implementation and network conditions, such inter-arrival gaps exhibit significant variation and have strong auto-correlation.

The inventors have determined that, for most real-time applications, packet arrival times when plotted as a function of time fall along one or more lines, where the slope of the line reflects the rate of the codec. They further note that while applications may change codec during one session (and the same codec can change its rate for adaptation purposes), such changes typically occur on a relatively larger time-scale, such as on the order of tens of seconds or even minutes.

Thus, in one embodiment, a common starting point is set and a calculation of the elapsed time between that starting point and each received packet (i.e., the packet arrival time or PAT) is made. This information is processed using incremental linear regression techniques that model packet arrival times to provide thereby indicia of whether a codec rate change has occurred. The inventors have determined that such processing of packet arrival times provides a more robust solution than techniques utilizing inter-arrival gap information, since PAT processing avoids local variations associated with inter-arrival gaps.

Figure 1:
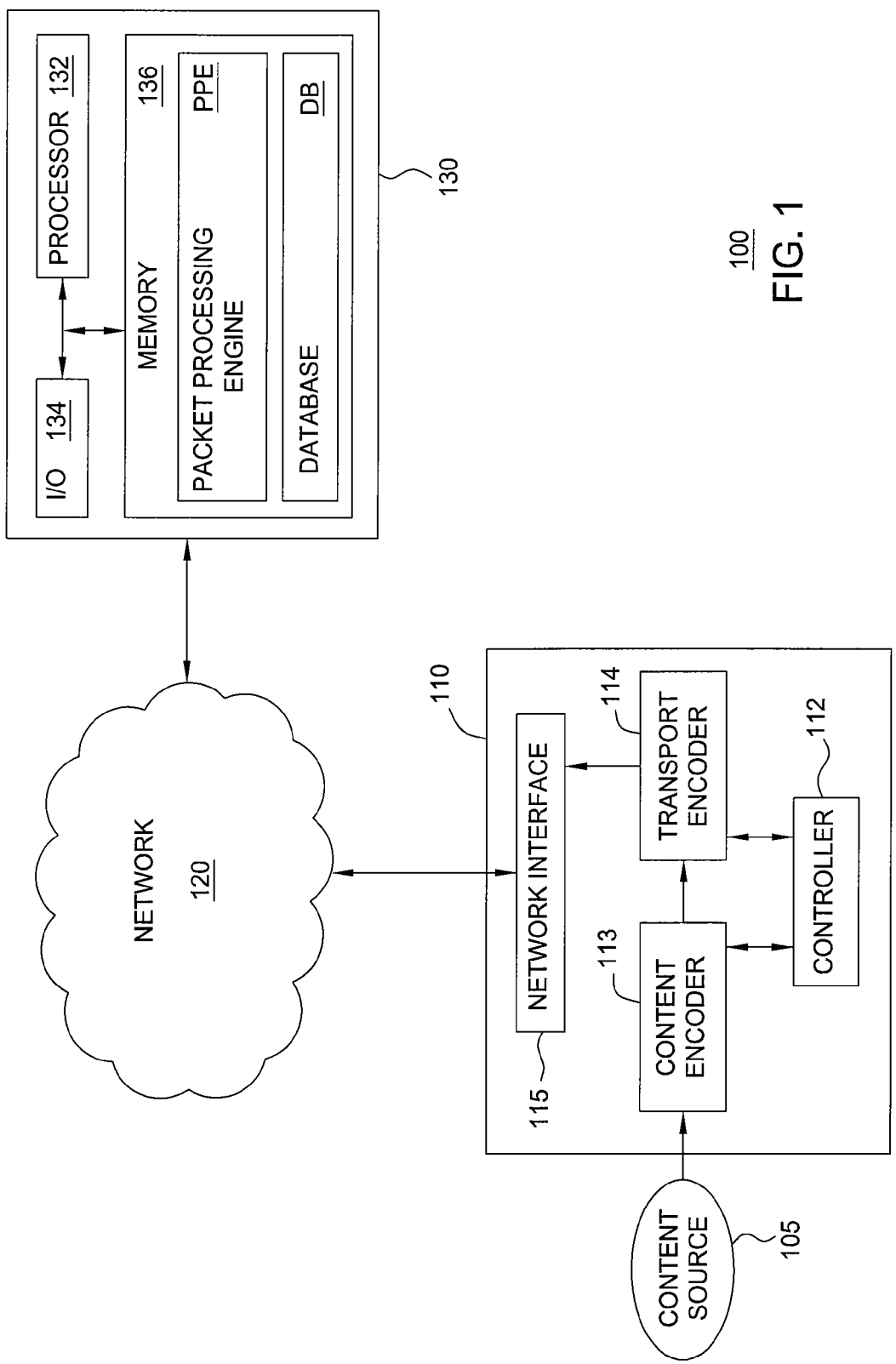
FIG. 1 depicts a high-level block diagram of a system according to various embodiments.

FIG. 1 depicts a high-level block diagram of a system according to various embodiments. Specifically, the system 100 of FIG. 1 comprises a content source 105, a transmitting node 110, a network 120 and the receiving node 130.

The content source 105 provides content such as streaming media, television, video on demand, shared movies or music files and the like to the transmitting node 110. The transmitting node 110 operates to encode the received content and transmit the encoded content to the receiving node 130 via the network 120. The receiving node 130 receives encoded content and processes the received encoded content according to the various embodiments discussed herein to identify characteristics associated with the codec used to encode the content.

In various embodiments, the transmitting node 110 and receiving node 130 may comprise respective nodes in a peer-to-peer configuration, a client server configuration, a file transfer protocol configuration or any other configuration. While not discussed in detail herein, in various embodiments a session is established between the receiving node 130 and transmitting node 110 in which specific content desired by the receiving node 130 is identified and requested of the transmitting node 110. In response, the transmitting node 110 retrieves the desired content, such as from the content source 105 or a mass storage device (not shown), encodes the retrieved content and conveys the encoded retrieved content to the receiving node 130 via the network 120.

Transmitting node 110 is depicted as including a controller 112, the content encoder 113, a transported coder 114 and a network interface 115. The specific functions discussed herein with respect to transmitting node 110 are relatively generic in nature. The controller 112 operates to control the content encoder 113 and transport encoder 114.

The content encoder 113 receives content from the content source 105 and encodes the content as appropriate. In the case of content previously encoded by the content source 105, the content encoder 113 simply passes the previous encoded content to the transport encoder 114. In the case of unencoded content, the content encoder 113 applies an appropriate encoding algorithm to the unencoded content to provide thereby encoded content, such as compressed video files, music files, audiovisual files and the like.

The transport encoder 114 applies an appropriate transport encoding algorithm to the encoded content to provide thereby transport encoded content suitable for transport via the network 120.

The network interface 115 conveys the transport encoded content to the network 124 propagation towards the receiving node 130.

The network 120 may comprise the Internet and/or one or more access networks suitable for conveying the packet stream including the encoded content to the receiving node 130.

The receiving node 130 is depicted as a general-purpose computer suitable for use in performing various different functions described herein. Specifically, the receiving node 130 is depicted as including a processor element 132 (e.g., a CPU), a memory 136, e.g., random access memory (RAM) and/or read only memory (ROM) and input output (I/O) circuit 134. The receiving node 130 may also include various communication interfaces and user input output devices (not shown). The memory 136 optionally includes various mass storage devices, including but not limited to tape drives, hard disk drives, optical drives and the like. Thus, in various embodiments, receiving node 130 operates as a computing device in which software instructions are retrieved from memory 136 and executed by the processor 132 to perform the various methodologies discussed herein.

It should be noted that the present invention may be implemented in software and/or in a combination of software and hardware, e.g., using application specific integrated circuits (ASIC), a general purpose computer or any other hardware equivalents. In one embodiment, software for executing the disclosed embodiments is loaded into memory 136 and executed by processor 132 to implement the functions as discussed above. As such, the various processes and data structures discussed herein with respect to the embodiments can be stored on a computer readable medium such as RAM memory, ROM memory, magnetic media or optical media and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Various embodiments are directed to identifying the type of codec used to provide encoded content received at, illustratively, the receiving node 130. Thus, the receiving node 130 is adapted to perform certain processes and functions in accordance with these embodiments. It is noted that a packet processing engine PPE and a database DB are depicted as supported by memory 136, though these functions may also be supported by external memory accessible to the receiving node 130.

Various embodiments utilize an incremental linear regression (ILR) algorithm to determine if packet arrival time (PAT) data lies approximately along a straight line.

An approximation factor is represented by a constant $\beta$, while a constant $\alpha$ represents a traffic rate. Specifically, let A(i) denote the arrival time of packet i. If packet arrival times are a perfectly constant bit rate, then A(i) can be represented as:

$$A(i) = \alpha I \quad \text{(eq. 1)}$$

Since the inter-arrival time between packets varies depending on the traffic conditions in the network, the arrival rate will be considered to be constant bit rate even if there are variations in the instantaneous rate. A regression line may be fitted to the arrival time data to determine the rate constant $\alpha$. Using a least squares regression for $\alpha$, the following equation is provided:

$$\alpha(k) = \frac{6 \sum_{i=1}^{k} i A(i)}{k(k+1)(2k+1)} \quad \text{(eq. 2)}$$

Any significant change in rate signifies a codec change or non-VoIP traffic.

In one embodiment, a determination as to whether the slope has changed significantly comprises determining whether all arrival points are within a distance of β from the regression line for some pre-specified value of β. If they are not, then it is assumed that there is a change in slope or that the data does not conform to a constant bit rate stream. There are two problems with this approach. The first is that there can be a few points that fall outside this band and this does not necessarily signify that the data is not consistent with a constant bit rate stream. The second problem is that it is necessary to compute the distance of all points from the current regression line, and that this involves storing all the data points as well as a significant computational burden.

To improve the prior embodiment, a computation is made for a necessary condition on the slope when all points lie within β of the regression line.

Assume that all points lie within β of some straight line with slope γ. The slope of the regression line will be greatest if the arrival time of packet i is of the form γi+β and the slope of the regression line will be least if the arrival time of packet i is of the form γi−β.

In this case, the slopes of the regression lines are given by the below equations:

$$\overline{\alpha}(k) = \gamma + \frac{3\beta}{2k+1} \quad \text{(eq. 3)}$$

$$\underline{\alpha}(k) = \gamma - \frac{3\beta}{2k+1} \quad \text{(eq. 4)}$$

Therefore, a feasible slope may be expressed as:

$$\gamma \in \left[ \alpha(k) - \frac{3\beta}{2k+1}, \alpha(k) + \frac{3\beta}{2k+1} \right] \forall k \quad \text{(eq. 5)}$$

A tightest interval for γ may be expressed as:

$$\gamma \in \left[ \text{Max}_k \left( \alpha(k) - \frac{3\beta}{2k+1} \right), \text{Min}_k \left( \alpha(k) + \frac{3\beta}{2k+1} \right) \right] \quad \text{(eq. 6)}$$

Therefore, if at any point it is determined that the condition of equation 7 is satisfied, then it is known that all points cannot lie within a constant β of some straight line.

$$\left[ \text{Min}_k \left( \alpha(k) + \frac{3\beta}{2k+1} \right) \right] < \left[ \text{Max}_k \left( \alpha(k) - \frac{3\beta}{2k+1} \right) \right] \quad \text{(eq. 7)}$$

It is noted that this condition has the following two properties: (1) If this condition is violated, then the arrival points do not lie within a constant distance of β from some straight line; and (2) the computation of the interval can be done in O(1) time without storing any data.

Therefore, the embodiment applies linear regression to packet arrival time vs. packet count. Retained data is indicative of both how well the arrivals fit in a line, and change of slope of the line (i.e., packet arrival rate). If the slope falls out of a pre-determined bound, then the regression is restarted from the new arrival time.

The above-described embodiments enable differentiation of real-time vs. non real-time applications according to how frequently the regression restarts. Further, for real-time applications, the slope of the line can be mapped to codec rate for further classification. That is, the slope and/or changes in slope over various time intervals provides a characteristic signature or behavior that may be associated with a particular traffic stream, codec and/or application.

Therefore, the various embodiments discussed herein provide a robust technique for detecting VoIP, IP video and other applications or traffic types with quasi-constant rates. The embodiments benefit from low implementation overhead and more accurate detection than existing methods. Further, the various embodiments are suitable for use even when the traffic is encrypted.

Figure 2:
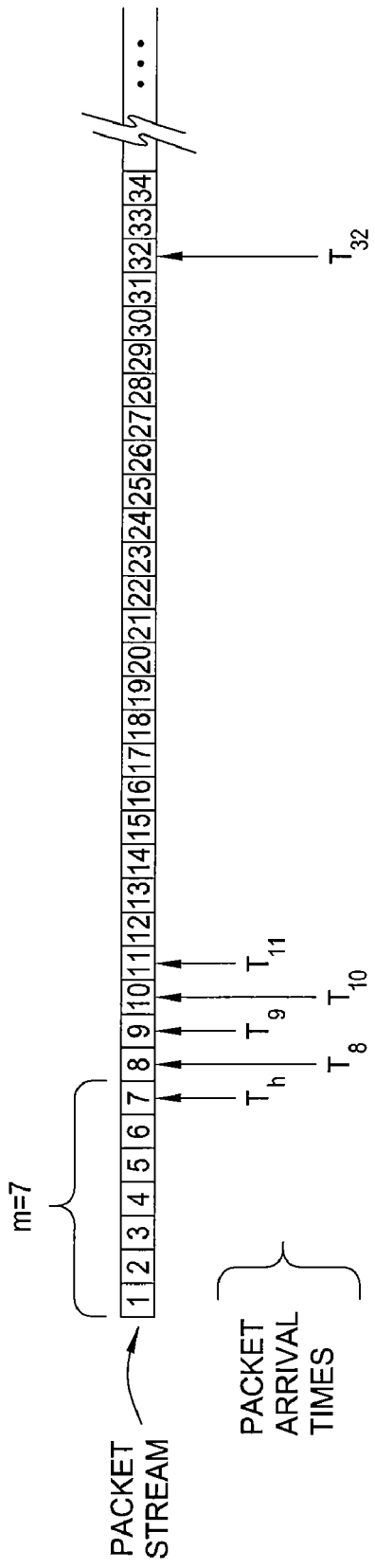
FIG. 2 graphically depicts a sequence of packets useful in understanding the present embodiments.

FIG. 2 graphically depicts a sequence of packets useful in understanding the present embodiments. Specifically, the sequence of packets 200 includes a plurality of initial packets (illustratively seven) including control information followed by a sequence of packets including encoded content. Each of the packets is associated with the respective packet arrival time (PAT) denoted as $T_n$, where n is the specific packet count number.

Figure 3:
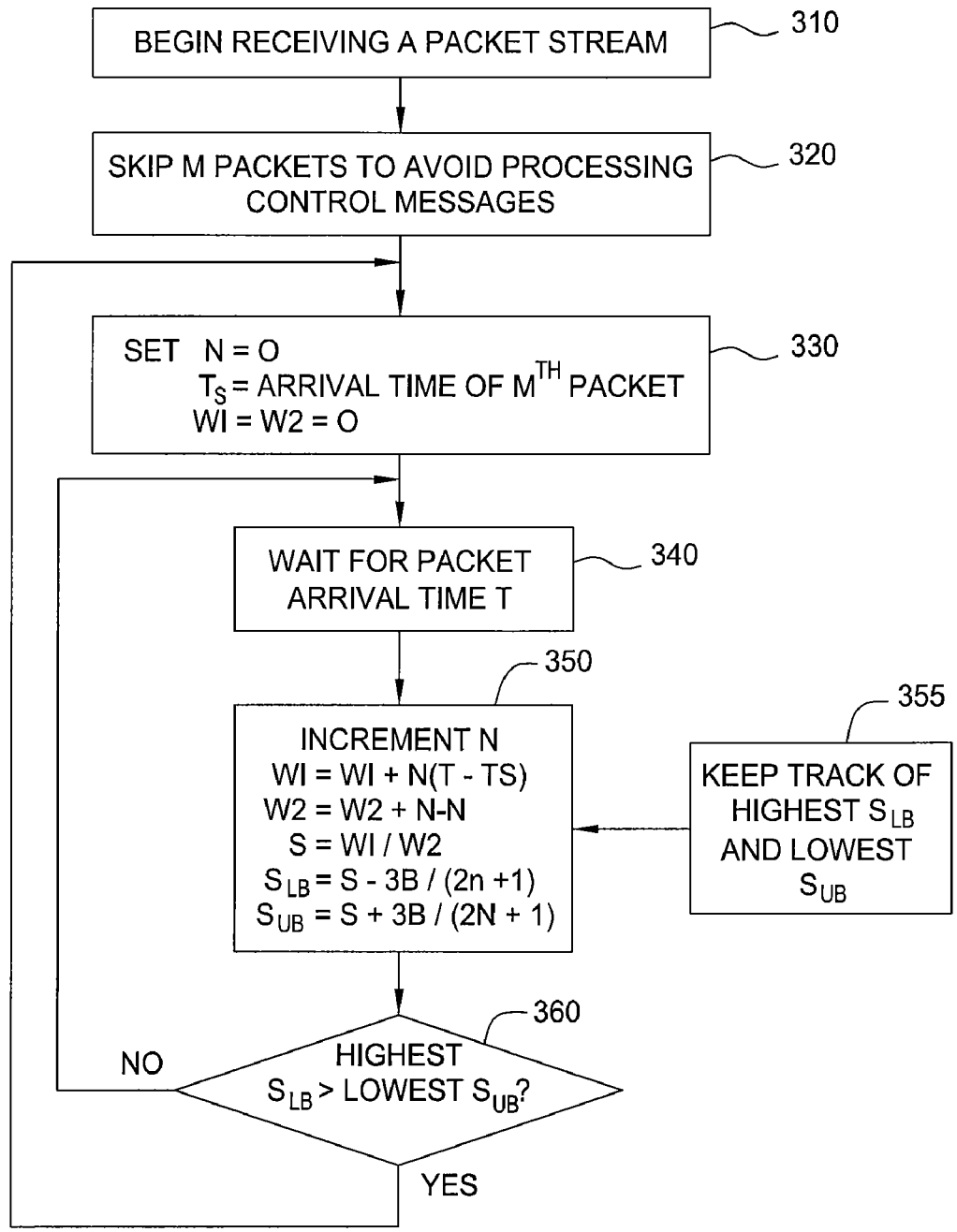
FIG. 3 depicts a flow diagram of a method for processing a packet stream according to one embodiment.

FIG. 3 depicts a flow diagram of a method for processing a packet stream according to one embodiment, such as a packet stream depicted in FIG. 2. The method 300 iteratively processes received packets according to an initialization portion, an inner loop and an outer loop. An initialization portion establishes certain initial parameters. An inner loop (steps 340-350) operates to perform an incremental linear regression function to derive thereby a slope associated with that increment. An outer loop (steps 330-360) operates to define the size of each increment.

Referring to FIG. 3, at step 310, the receiving node 130 begins (or continues) receiving a packet stream. At step 320, a plurality of packets (illustratively m packets) is skipped to avoid a processing control message and other non-content data. At step 330, a plurality of variables is initialized as follows:

Counter N is set equal to zero;
Timer Ts is set to the arrival time of the mth packet; and
Variables W1 and W2 are set to zero.

At step 340, the method 300 waits for the arrival of the next packet. Upon receiving the next packet at an arrival time T, the method 300 proceeds to step 350 where the following actions are taken:

Increment N;

$W1=W2+N(T-Ts);$ $W2=W2+N\cdot N;$ $S=W1/W2;$ $S_{LB}=S-3\beta/(2N+1);$ and $S_{UB}=S+3\beta/(2N+1).$ The parameter β defines a tolerance factor; that is, the distance that data points are allowed to deviate from the regression line. In addition, referring to box 355, the highest value of $S_{LB}$ and the lowest value of $S_{UB}$ is tracked as, respectively, $S_{LBmax}$ and $S_{UBmin}$.

At step 360, a query is made as to whether the highest value of $S_{LB}$ is greater than the lowest value of $S_{UB}$ (i.e., whether $S_{LBmax} > S_{UBmin}$). If the query at step 360 is answered negatively, then the method 300 repeats steps 350-360. In this case, additional data is gathered within the context of these steps to further define the time interval including a line within which all data points are within a distance β. If the query at step 360 is answered affirmatively, then the method 300 repeats steps 330-360. In this case, a new time interval is initiated (i.e., the loop is reinitialized) and a new line is defined by the inner loop.

In operation, the inner and outer loop steps discussed above with respect to the method 300 (and below with respect to the method 400) result in the generation of multiple concatenating lines. The number of such lines in a given time period, along with the slope of each line, represents a "signature" of the traffic flow being processed. Specifically, each time the inner loop is executed a regression line is defined according to the arrival times of packets received during loop execution. The regression line has associated with it a slope parameter and a length parameter. The slope of the regression line is defined by the packet arrival times and packet counts. The length parameter is defined by the amount of time that the inner loop executes prior to reinitialization. Reinitialization of the inner loop occurs when packet arrival times exhibit a distance from the regression line above a threshold distance $\beta$.

In the case of a relatively well behaved or steady traffic flow having relatively consistent packet arrival times, the method will tend to produce a regression line having tight bunching of PAT data points about the regression line. In this case, the inner loop may execute for multiple seconds or even minutes depending upon the type of application. The traffic signature comprises fewer concatenated regression lines, each regression line having a similar slope.

In the case of a less steady traffic flow having relatively inconsistent packet arrival times, the method will tend to produce a regression line having looser bunching of PAT data points about the regression line. In this case, the inner loop may be frequently reinitialized as data points exceed the distance parameters used to trigger a new inner loop execution.

In one embodiment, the method 300 discussed above is modified to include a default loop reinitialization timer which causes the method 300 to return to step 330 at the expiration of a predefined period of time, thereby reinitializing the inner loop 330-360. The predefined period of time may be selected from one or several seconds up to one or several minutes (typically).

The different settings depend upon the specific application to be identified. Those applications in which a specific traffic signature occurs over a relatively long period time they use a longer reinitialization time. Such applications include voice over IP (VoIP) and other applications in which relatively small packets are consistently conveyed during application operation. Other applications, such as streaming video applications in which data packets may be of varying length or of varying data density (amount of data conveyed per unit time) benefit from a shorter reinitialization time.

Thus, in various embodiments the traffic signature associated with an application to be identified may comprise an amount of time between inner loop reinitializations (i.e., regression line length), and/or a number of times a distance threshold is crossed by PAT data within a specific inner loop execution period.

Figure 4:
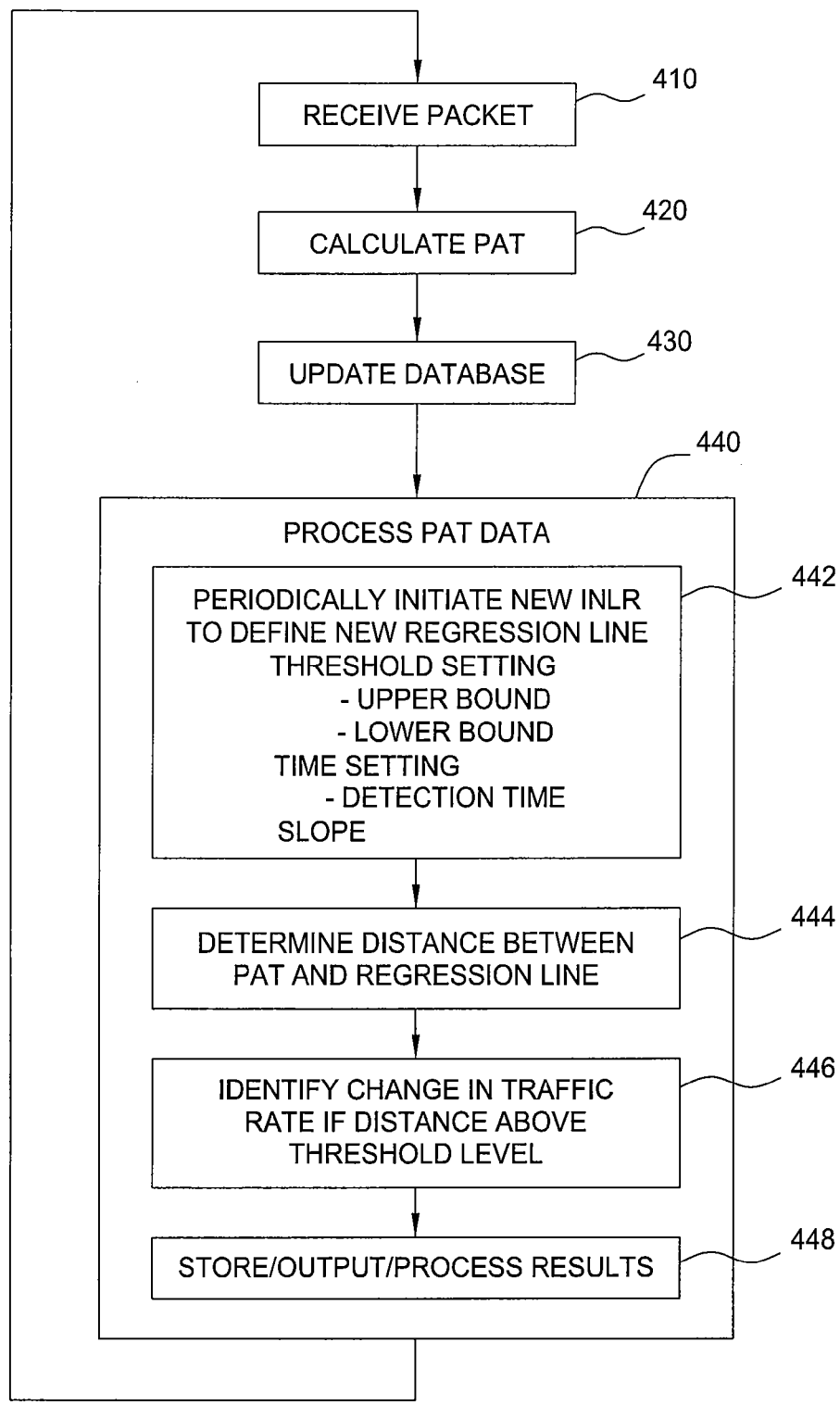
FIG. 4 depicts a flow diagram of a method for processing a packet stream according to one embodiment.

FIG. 4 depicts a flow diagram and method for processing a packet stream according to one embodiment. Specifically, the method 400 receives a packet at step 410, calculates the packet arrival time at step 420 and updates a database or other data structure with the calculated PAT of the packet. At step 440, the PAT data is processed according to steps 442-448.

Specifically, at step 442 a new incremental nonlinear regression is periodically initiated to define thereby a new regression line for a subsequent plurality of packets. Several conditions may be used independently or in any combination to trigger such reinitialization.

Reinitialization optionally occurs when a time setting or detection time parameter has expired (e.g., one or several seconds up to one or several minutes as discussed earlier). In various environments, the detection time is selected as any of one second, 3 seconds, 5 seconds, 10 seconds, 15 seconds, 30 seconds, 45 seconds, 60 seconds, 90 seconds, 120 seconds and the like.

Reinitialization optionally occurs when a predefined number of packet arrival times exceeding a threshold distance from the regression line exceeds either of a lower boundary threshold or an upper boundary threshold. The lower boundary threshold comprises a tolerance factor $\beta$ that is closer or tighter to the regression line than the upper boundary threshold. In various embodiments, reinitialization is triggered by a first number of PATs exceeding the lower boundary threshold (e.g., 5) and/or a second number of PATs exceeding the upper boundary threshold (e.g., 3). The actual upper and lower boundary thresholds, as well as the number of excursions beyond those thresholds, may be selected to identify specific applications such as by empirically selecting the boundary conditions associated with a characteristic signature of a specific application.

Reinitialization optionally occurs when a slope of the regression line matches a predefined slope value, remains constant for a predefined period of time and/or remains at a predefined slope value for a predefined period of time.

Reinitialization optionally occurs when an existing regression line has been determined and incoming packet arrival times begin to insufficiently correlate to the determined regression line.

At step 444, a distance is determined between the calculated PAT and the presently formed regression line.

At step 446, a change in traffic rate is identified where the distance determined at step 444 is above a threshold level. In the case of the distance being above a threshold level, a new INLR may be initiated the next time the method 400 execute step 442.

At step 448, information calculated at step 446 is stored for later use, and output to another processing module and/or used to process the received packet stream. For example, in one embodiment the regression line duration and slope of each interval is stored in memory 136, such as within the database in DB. Optionally, the number of PATs exceeding one or more distance thresholds associated with the regression line is stored in memory 136. If a slope of the regression line associated with an interval changes during that interval, such changes may also be stored in memory 136. While discussed primarily with respect to memory 136, it should be noted that data associated with intervals may also be forwarded to a different network element for subsequent processing, such as to a management system in which traffic characteristics are determined using the interval data.

The method 400 is then repeated.

The methodologies discussed above with respect to FIGS. 3 and 4 may be adapted by those skilled in the art and informed by the teachings of the present disclosure. Specifically, the various techniques discussed above with respect to equations 1-7 may be used to adapt the operations of methods 300 and 400. Moreover, while generally discussed as the processing of packets at a node receiving the packets (e.g., receiving node 130), the PAT and other data associated with a packet stream may be processed in a node or other entity (e.g., management software) remote from the packet stream receiving node.

The various embodiments discussed herein are well-suited for network-based detection of VoIP, video applications, file transfers and the like. Such detection is a function of interest to service providers. Beneficially, techniques described herein with respect to the various embodiments provide such network-based detection functionality in a more robust manner and with relatively few false positives.

In one embodiment, a packet stream receiver processes received packet streams according to the various embodiments to identify the type of application associated with streams. The packet stream receiver may comprise a switch, a router, a network node, an edge router, an element or network management device, server equipment, subscriber equipment and so on. Embodiments may be usefully deployed within the context of packet sniffers, firewall devices and other network security systems.

In one embodiment, a management system associated with, illustratively, an edge router or other network element monitors selected packet streams passing through edge router or other network element and responsively constrains quality of service (QoS) and/or other parameters associated with packets change meeting certain criteria. In this manner, packet streams associated with specific applications may be controlled to avoid excessive bandwidth consumption.

In one embodiment, an edge router or other network entity utilizes the various embodiments to monitor selected packet streams and constrain one or more packet stream quality of service (QoS) parameters in response to the identification of a particular application type (e.g., a peer to peer application type or a streaming video application type) or traffic flow signature (e.g., a signature associated with a disfavored application type or traffic consumption level). That is, in various embodiments the criteria comprises application identification criteria, while in other embodiments the criteria is not application-specific.

Thus, in various embodiments a mechanism is provided for analyzing traffic flows on an interval by interval basis to identify therein specific application types or resource usage characteristics so that specific application types may be preferentially allocated bandwidth or other resources (or preferentially constrained from consuming bandwidth or other resources).

Although various embodiments which incorporate the teachings of the present invention have been shown and described in detail herein, those skilled in the art can readily devise many other varied embodiments that still incorporate these teachings.

The invention claimed is:

1. A method for identifying an application associated with a packet stream, comprising:
determining, for each of a plurality of time intervals, packet arrival times (PATs) for received packets of interest within the packet stream;
fitting a regression line to the determined PATs of the received packets of interest for each time interval, the regression line having associated with it a slope indicative of a traffic rate of the packet stream during the time interval; and
using the regression line associated with the time interval to identify the type of application provided via the packet stream.

2. The method of claim 1, wherein each time interval comprises a predefined time interval.

3. The method of claim 1, further comprising:
determining whether each PAT is within a first threshold distance from a currently fitted regression line; and
beginning a new time interval when a predefined number of PATs exceed the first threshold distance from the regression line.

4. The method of claim 3, further comprising:
determining whether each PAT is within a second threshold distance from a currently fitted regression line; and
beginning a new time interval when a predefined number of PATs exceeds the second threshold distance from the regression line.

5. The method of claim 3, further comprising:
determining whether each PAT is within a first threshold distance from a currently fitted regression line; and
determining whether each PAT is within a second threshold distance from a currently fitted regression line; and
beginning a new time interval when a first predefined number of PATs exceeds the first threshold distance from the regression line and a second predefined number of PATs exceeds the second threshold distance from the regression line.

6. The method of claim 3, further comprising:
beginning a new time interval when a predefined amount of time has lapsed for a present time interval.

7. The method of claim 1, further comprising:
beginning a new time interval when a slope of the present time interval matches a predefined slope value.

8. The method of claim 1, further comprising:
beginning a new time interval when a slope of the present time interval remains constant for a predefined period of time.

9. The method of claim 1, wherein using the regression lines associated with the time intervals to identify the type of application provided via the packet stream comprises examining concatenated regression lines formed by the various time intervals to identify thereby a signature of a traffic flow being processed.

10. The method of claim 1, wherein said method is utilized by a network element to monitor selected packet streams passing therethrough and constrain a packet stream quality of service (QoS) parameter in response to the identification of a particular application type.

11. The method of claim 1, wherein said method is utilized by a network element to monitor selected packet streams passing therethrough and constrain a packet stream quality of service (QoS) parameter in response to the identification of a particular traffic flow signature.

12. A method for identifying an application associated with a packet stream, comprising:
iteratively performing the following steps (a) through (d) for each of a plurality of time intervals:
(a) determining packet arrival times (PATs) for received packets of interest within the packet stream;
(b) fitting a regression line to a plurality of determined PATs associated with a present time interval, the regression line having associated with it a slope indicative of a traffic rate of the packet stream during the present time interval;
(c) storing data associated with the regression line of the present time interval; and
(d) in response to a PAT within the present time interval having a distance from the regression line exceeding a threshold amount, initiating a new time interval;
determining the type of application provided via the packet stream by using a regression line data associated with the plurality of time intervals.

13. A non-transitory computer readable medium for storing instructions which, when executed by a processor, adapt the operation of the computer to perform a method for identifying an application associated with a packet stream, comprising:

determining, for each of a plurality of time intervals, packet arrival times (PATs) for received packets of interest within the packet stream;

fitting a regression line to the determined PATs of the received packets of interest for each time interval, the regression line having associated with it a slope indicative of a traffic rate of the packet stream during the time interval; and using the regression lines associated with the time intervals to identify the type of application provided via the packet stream.

14. Apparatus comprising:

a memory for storing software instructions and a processor for executing the software instructions, wherein the software instructions when executed by the processor cause the apparatus to:

determine, for each of a plurality of time intervals, packet arrival times (PATs) for received packets of interest within the packet stream;

fit a regression line to the determined PATs of the received packets of interest for each time interval, the regression line having associated with it a slope indicative of a traffic rate of the packet stream during the time interval; and use the regression line associated with the time interval to identify the type of application provided via the packet stream.

15. The apparatus of claim 14, wherein said apparatus is included within an edge router.

16. The apparatus of claim 14, wherein said apparatus is included within any of a switch, router, network node, edge router and network management device.

17. The apparatus of claim 14, wherein said apparatus is included within one of a packet sniffer or a firewall device.

* * * * *